(12) United States Patent
Yoshino (10) Patent No.: US 7,643,205 B2
(45) Date of Patent: Jan. 5, 2010

(54) HARMONICS GENERATING DEVICES

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/396,759

(22) Filed: Mar. 3, 2009

(65) Prior Publication Data

US 2009/0231680 A1    Sep. 17, 2009

(30) Foreign Application Priority Data

Mar. 11, 2008    (JP)   .............................. 2008-061058

(51) Int. Cl.
*G02F 1/35* (2006.01)
(52) U.S. Cl. ........................ 359/328; 359/326; 359/329; 385/122; 385/132; 372/22
(58) Field of Classification Search ......... 359/326–332; 372/22; 385/122, 129
See application file for complete search history.

(56) References Cited

U.S. PATENT DOCUMENTS

2007/0189689 A1    8/2007    Yamaguchi et al.

2007/0223081 A1 *    9/2007    Yoshino et al. ............. 359/326

FOREIGN PATENT DOCUMENTS

WO    WO 2006/041172 A1    4/2006

* cited by examiner

*Primary Examiner*—Hemang Sanghavi
(74) *Attorney, Agent, or Firm*—Burr & Brown (57) ABSTRACT

A harmonics generating device including a supporting substrate; a wavelength conversion layer having a three-dimensional optical waveguide provided with a periodic domain inversion structure therein, a base adhesive layer for adhering a lower face of the wavelength conversion layer to the supporting substrate; an upper-side substrate provided on an upper face side of the wavelength conversion layer; an upper-side adhesive layer for adhering the wavelength conversion layer to the upper-side substrate; an incident face of a fundamental wave, a projection face of higher harmonics, a first side face between the incident face and the projection face; and a second side face opposing the first side face. A first conductive material contacts the first side face, a second conductive material contacts the second side face, and the first and second conductive materials are electrically connected.

3 Claims, 7 Drawing Sheets

Fig. 7

HARMONICS GENERATING DEVICES

This application claims the benefit of Japanese Patent Application P2008-61058 filed on Mar. 11, 2008, the entirety of which is incorporated by reference.

TECHNICAL FIELD

The present invention relates to a harmonics generating device of a quasi phase matching system.

BACKGROUND ART

Nonlinear optical crystal such as lithium niobate or lithium tantalate single crystal has a high secondary nonlinear optical constant. When a periodic domain polarization inversion structure is formed in the above crystals, a second-harmonic-generation (SHG) device of a quasi-phase-matched (QPM) system can be realized. Further, when a waveguide is formed within this periodic domain inversion structure, the high-efficiency SHG device can be realized and further, applied to optical communication, medical science, photochemistry, various optical measurements over a wide range.

In a harmonics generating device disclosed in WO 2006/41172 A1, a thin plate of a ferroelectric single crystal is adhered to a supporting substrate and thereon, an upper-side substrate is adhered through a buffer layer and an adhesive layer, thereby forming a channel type optical waveguide within the thin plate. Further, the periodic domain inversion structure is formed within this optical waveguide, whereby a fundamental wave incident into the optical waveguide is subjected to wavelength conversion into higher harmonics.

DISCLOSURE OF THE INVENTION

A harmonics generating device such as an SHG generating device is required to stably operate even if being repeatedly exposed to changes of environmental temperature. However, it was found that in the device as disclosed in WO 2006/41172 A1, after the device was repeatedly exposed to a heat cycle between −40° C. and +80° C., its wavelength conversion efficiency was deteriorated in some cases.

The present inventors, when recovering and observing the above-described device in which the wavelength conversion efficiency was deteriorated, found that a periodic domain inversion structure was deteriorated. Moreover, the inventors have found that such a phenomenon is observed when an X plate (Y plate) or an offset X plate (offset Y plate) is used, but not observed when a thin plate of a Z plate is used. Further, the inventors have found that the phenomenon is characteristic to the device in which a ferroelectric thin plate for performing wavelength conversion is interposed between the supporting substrate and the upper-side substrate as disclosed in WO 2006/41172 A1.

An object of the present invention is to prevent a reduction in the wavelength conversion efficiency of the harmonics generating device having a structure in which a periodic domain inversion structure is formed in a thin plate of the X plate or offset X plate and is interposed between a supporting substrate and a upper-side substrate, after the device is exposed to heat cycles.

The present invention provides a harmonics generating device comprising:

a supporting substrate;

a wavelength conversion layer comprising a channel type optical waveguide comprising a periodic domain inversion structure provided therein, the layer comprising an X plate or offset X plate comprising a ferroelectric single crystal;

a base adhesive layer for adhering a lower face of the wavelength conversion layer and the supporting substrate;

an upper-side substrate provided on an upper face side of the wavelength conversion layer;

an upper-side adhesive layer for adhering the wavelength conversion layer and the upper-side substrate;

an incident face of a fundamental wave;

a projection face of higher harmonics;

a first side face between the incident face and the projection face; and a second side face opposing the first side face, the device further comprising:

a first conductive material contacted with the first side face; and a second conductive material contacted with the second side face;

wherein the first conductive material and the second conductive material are electrically conductive to each other.

The wavelength conversion layer is exposed to the first and second side faces, respectively, and the first and second conductive materials contact the wavelength conversion layer at the first and second side faces.

The inventors have examined a cause of the reduction in the wavelength conversion efficiency in the harmonics generating device having a structure in which the periodic domain inversion structure is formed in the thin plate of the X plate or offset X plate and is interposed between the supporting substrate and the upper-side substrate, after the device is exposed to heat cycles. Then, when the thin plate of the harmonics generating device was subjected to an etching process, the periodic domain inversion structure was deteriorated or locally broken. This proved to cause the reduction in the wavelength conversion efficiency.

As a result of further investigations concerning the cause of such deterioration in the periodic domain inversion structure, the present inventors have found that pyroelectricity generated between both the side faces of the device causes the deterioration. Based on this finding, the inventors have found that conductive materials are caused to be each contacted with both the side faces of the harmonics generating device and these materials are caused to be conductive to each other, thereby preventing the reduction in the wavelength conversion efficiency after the exposure to heat cycles. The present invention has been thus accomplished.

BEST MODES FOR CARRYING OUT THE INVENTION

Figure 1:
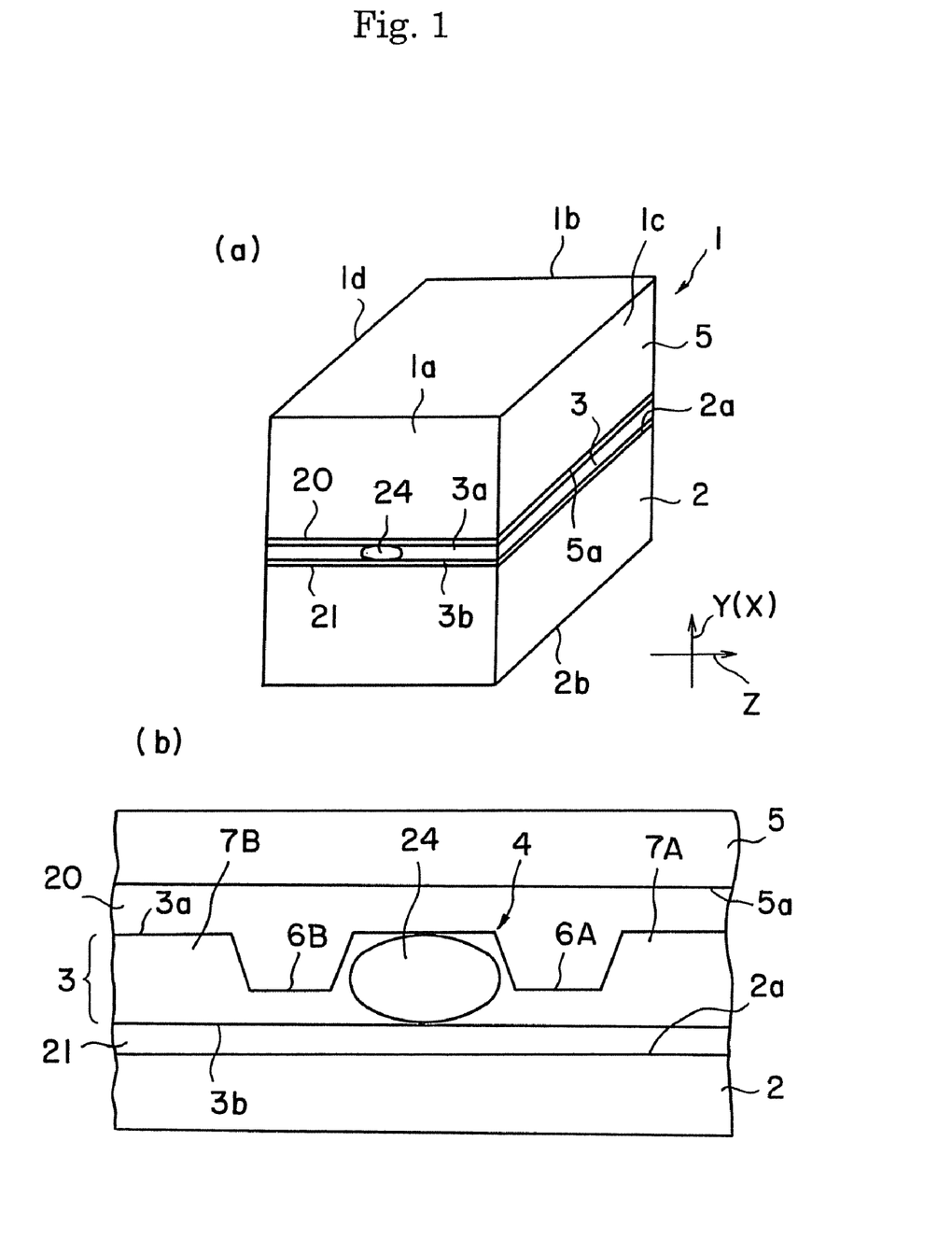
FIG. 1(a) is a perspective view schematically showing a harmonics generating device 1 to which the present invention may be applied.
FIG. 1(b) is an enlarged view showing a channel type optical waveguide 24 of the device 1 and a vicinity of the waveguide 24.
Figure 2:
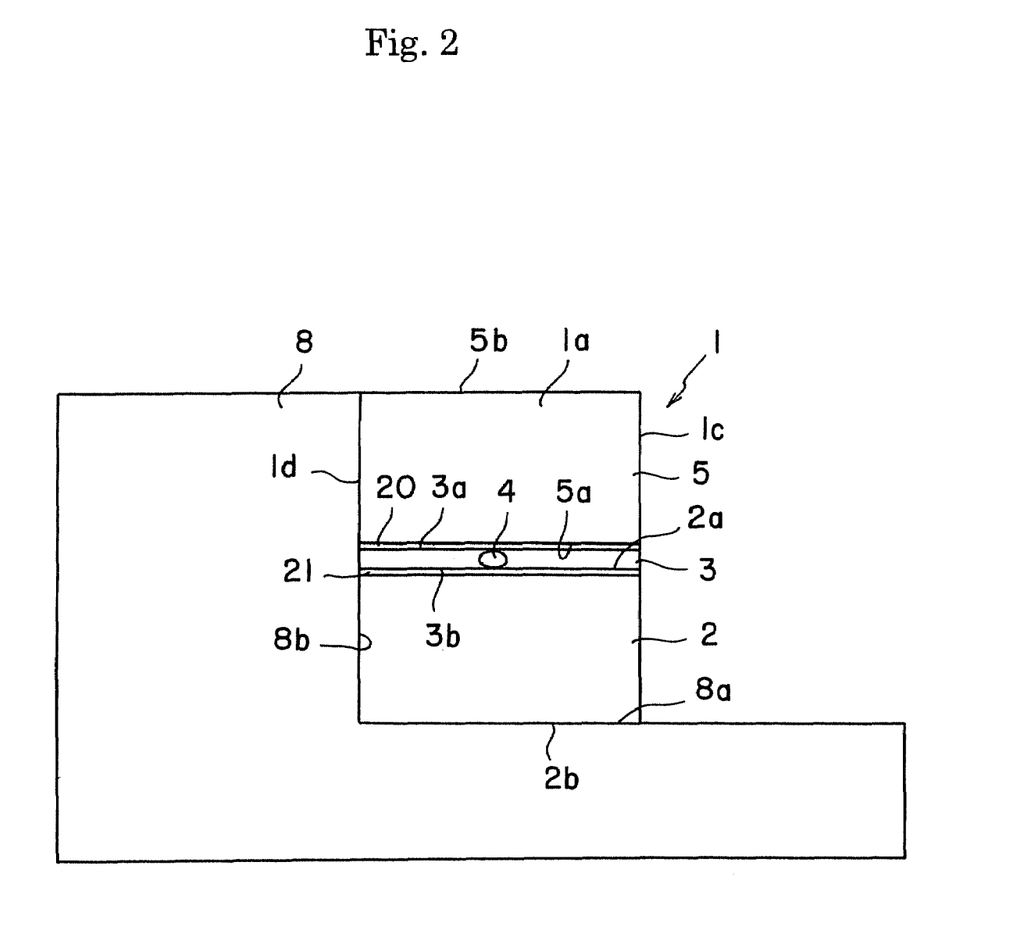
FIG. 2 is a front view showing the device 1 of FIG. 1 is installed on a pedestal 8.

FIG. 1(a) is a perspective view schematically showing a harmonics generating device 1 to which the present invention may be applied, and FIG. 1(b) is an enlarged view showing a channel type optical waveguide 24 of the device 1 and a vicinity of the waveguide 24. FIG. 2 is a front view showing a state in which the device 1 of FIG. 1 is installed on a pedestal 8.

As shown in FIG. 1, a pair of elongated grooves 6A and 6B is provided in a wavelength conversion layer 3 including an X plate (a Y plate, an offset X plate, or an offset Y plate) composed of ferroelectric single crystal. The grooves 6A and 6B are arranged in parallel with each other and a ridge part 4 is formed by these grooves. The channel type optical waveguide 24 is formed by the ridge part 4 and the grooves 6A and 6B. On outside of the grooves 6A and 6B, extension parts 7A and 7B are formed respectively, and the parts form a thin plate.

In the case of the X plate (Y plate), a horizontal direction is a Z direction and the ferroelectric single crystal is polarized in the Z direction in FIGS. 1(a) and 1(b). The X axis (Y axis) is perpendicular to an upper face 3a of the wavelength conversion layer 3. In the case of the offset X plate and the offset Y plate, the X axis (Y axis) is inclined from a face perpendicular to the main face of the wavelength conversion layer 3. This inclination angle is preferably 10 degrees or less from the viewpoint of the present invention.

Within the channel type optical waveguide 24, the polarization is made to the Z direction perpendicular to a traveling direction of light, and the polarization direction is periodically inverted. As a result, a fundamental wave incident from an incident face 1a of the device 1 is subjected to wavelength conversion within the optical waveguide 24 and higher harmonics project from a projection face 1b.

A lower face 3b of the wavelength conversion layer 3 is adhered to an upper face 2a of the separate supporting substrate 2 through a base adhesive layer 21. An upper face 3a of the wavelength conversion layer 3 is adhered to a lower face 5a of the separate upper-side substrate 5 through an upper-side adhesive layer 20. Reference numerals 1c and 1d denote a pair of side faces extending between the incident face 1a and the projection face 1b, and the side faces 1c and 1d face to each other. Typically, as shown in FIG. 2, the pedestal 8 including installation faces 8a and 8b is formed and the device 1 is installed on the pedestal 8 to be connected with external lines. The side face 1d of the device 1 is contacted with the installation face 8b, and a lower face 2b of the device 1 is contacted with the installation face 8a of the pedestal 8.

According to the finding of the present inventor herein, after the exposure to heat cycles, a periodic domain inversion structure formed in the channel type optical waveguide 24 is deteriorated due to pyroelectricity generated between the side faces 1c and 1d of the harmonics generating device 1. As a result, the inventors have found that conductive materials are caused to be contacted with the side faces 1c and 1d, respectively, and the materials are caused to be electrically conducted with each other, thereby preventing the deterioration in the periodic domain inversion structure after the exposure to the heat cycles.

A shape of the conductive material is not particularly limited. In a preferred embodiment, the first conductive material is the conductive plate, and the second conductive material is the pedestal for installing the harmonics generating device.

Figure 3:
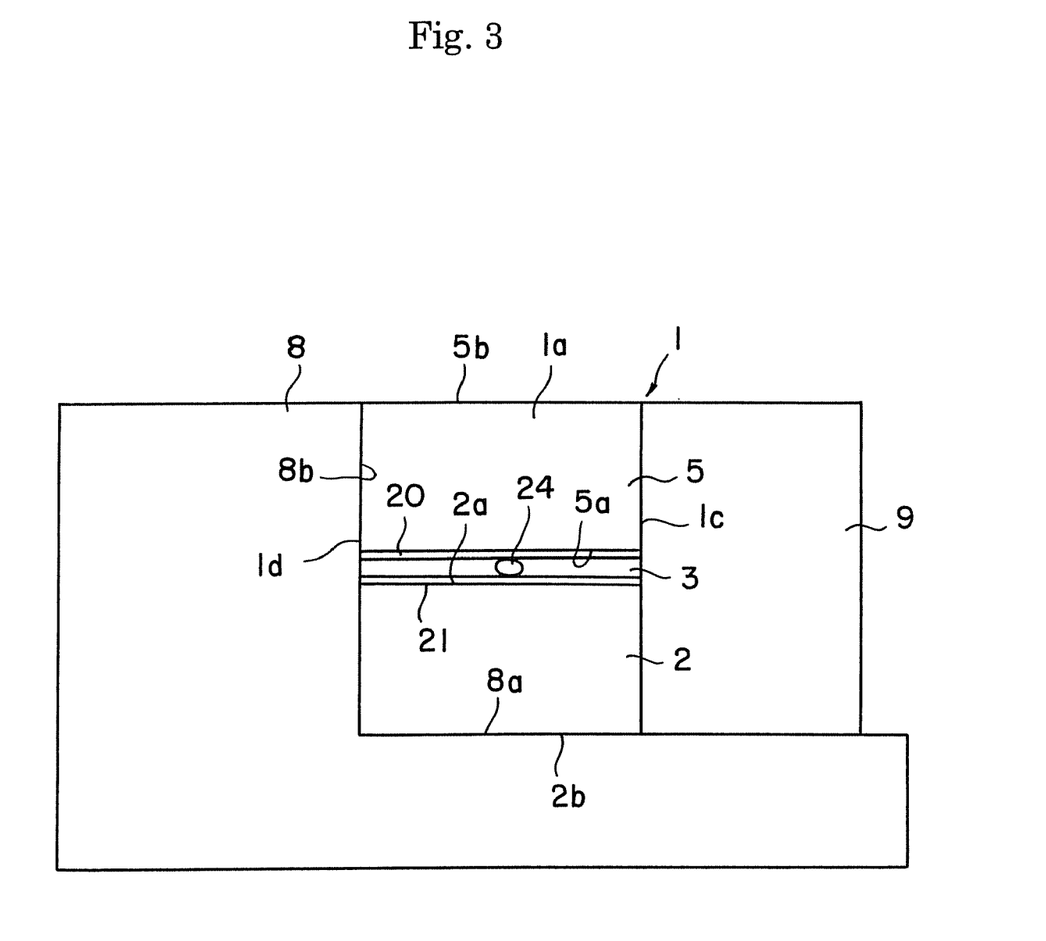
FIG. 3 is a front view schematically showing the device 1 of an embodiment of the present invention installed on the pedestal 8.

FIG. 3 is a front view schematically showing a state in which the device 1 of an embodiment is installed on the pedestal 8. The device used in this example is the same as that of FIGS. 1 and 2. It should be noted that a metal plate 9 is installed on the pedestal 8, and the metal plate 9 is contacted with the side face 1c of the device 1. Further, the other side face 1d of the device 1 is contacted with the installation face 8b of the conductive pedestal 8. The pedestal 8 and the metal plate 9 are electrically conductive to each other.

Figure 4:
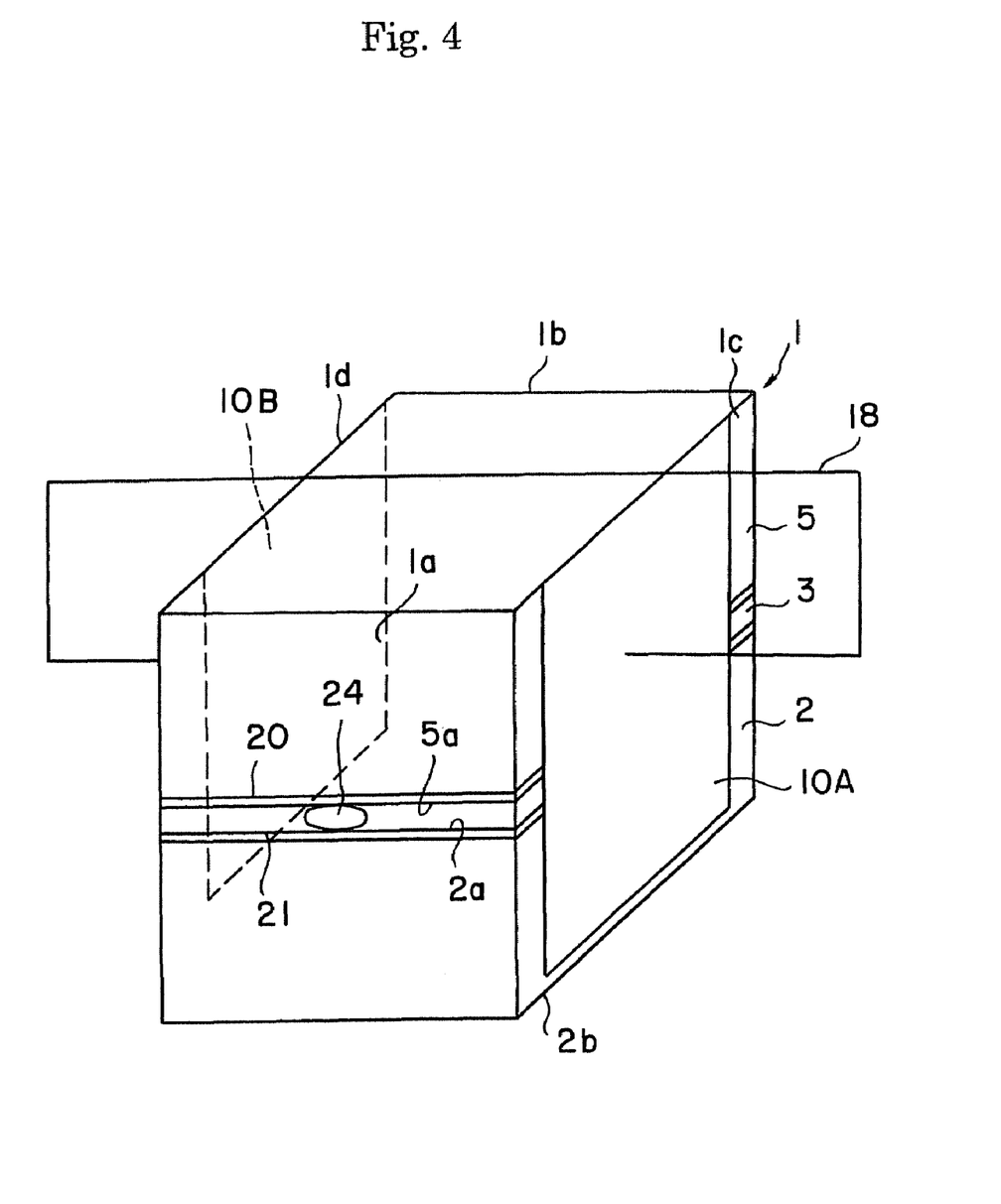
FIG. 4 is a perspective view schematically showing the device 1 of the embodiment of the present invention.
Figure 5:
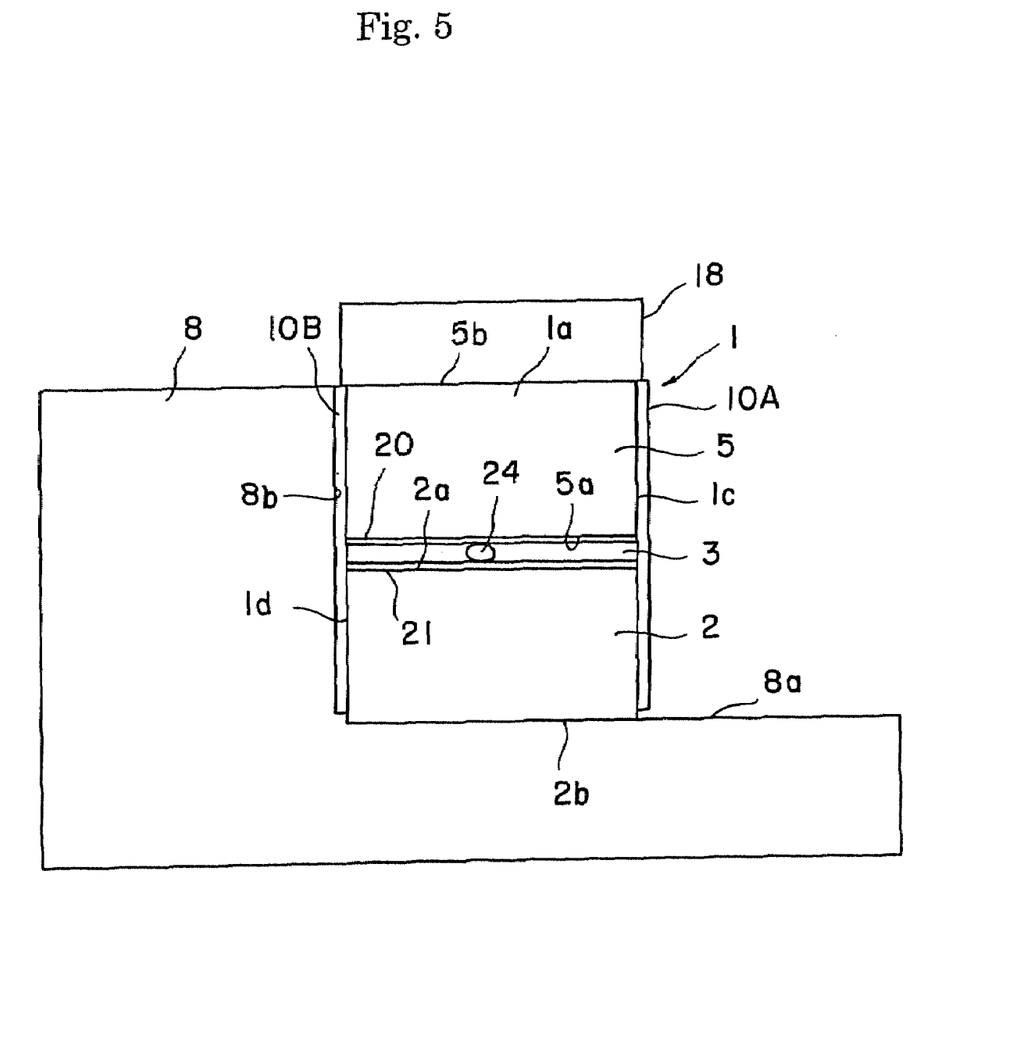
FIG. 5 is a front view schematically showing the device 1 of FIG. 4 installed on the pedestal 8.

In a preferred embodiment, the first and second conductive materials are conductive layers. FIG. 4 is a perspective view schematically showing the device 1 of the embodiment, and FIG. 5 is a front view schematically showing a state in which the device 1 of FIG. 4 is installed on the pedestal 8.

The device used in this example is the same as that of FIGS. 1 and 2. It should be noted that a first conductive layer 10A is formed on the side face 1c of the device, and a second conductive layer 10B is formed on the side face 1d of the device. Further, the conductive layers 10A and 10B are short-circuited together through conductive means 18 such as a conductive wire. As a result, the conductive layers 10A and 10B are electrically conductive to each other.

Figure 6:
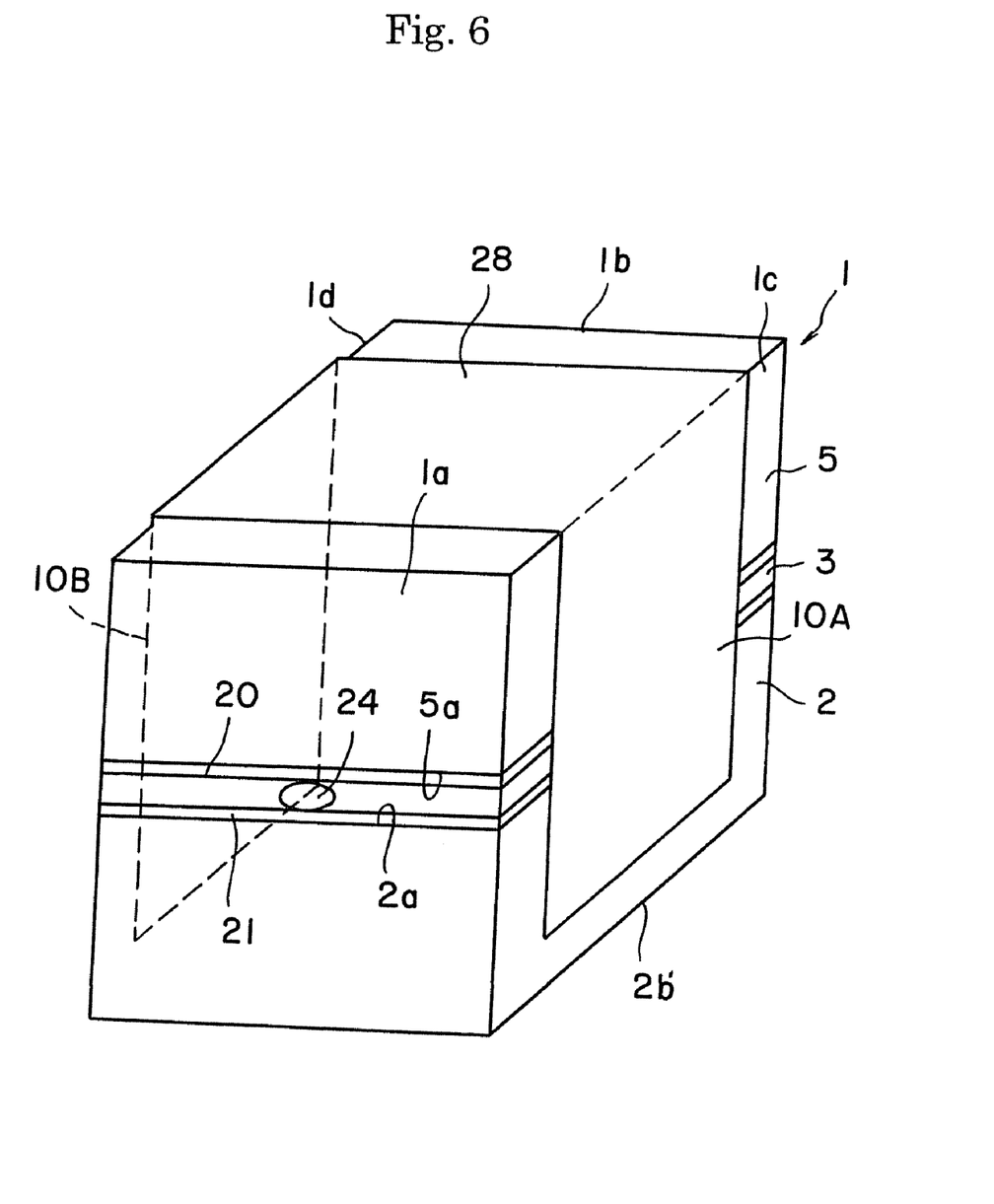
FIG. 6 is a perspective view schematically showing another device 1 of the embodiment of the present invention.
Figure 7:
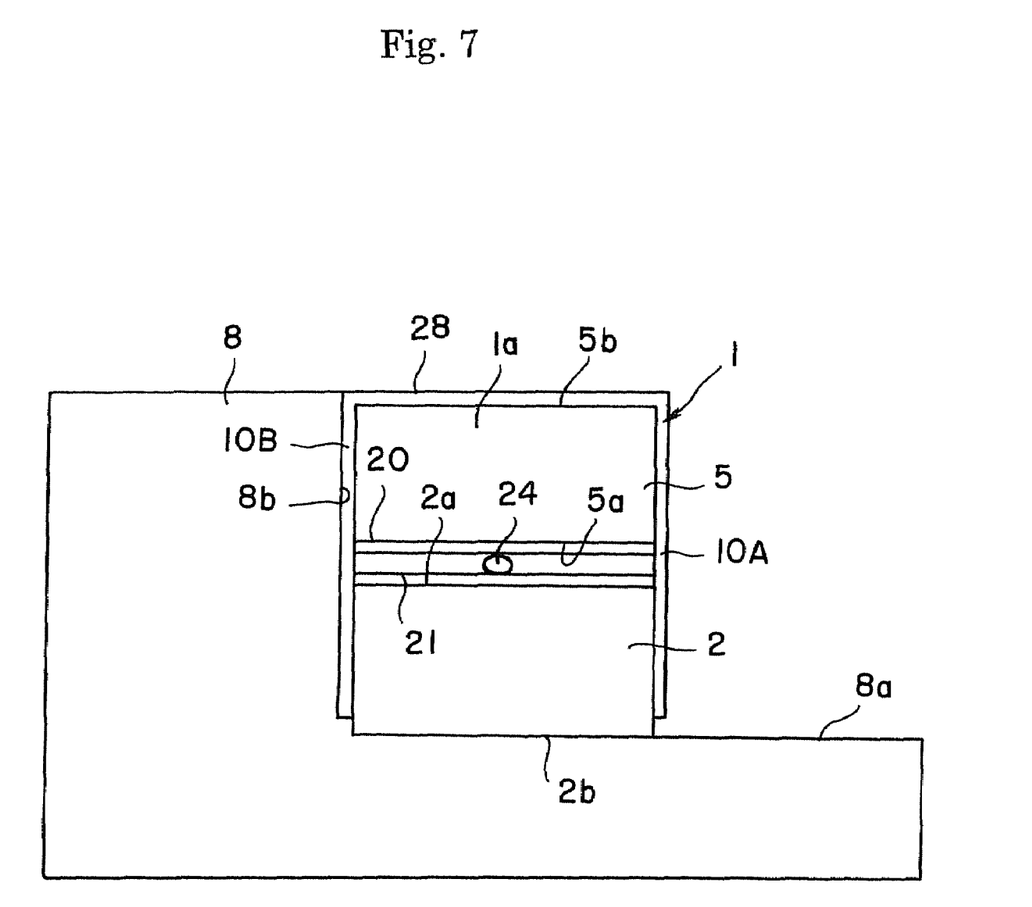
FIG. 7 is a front view schematically showing the device 1 of FIG. 6 installed on the pedestal 8.

FIG. 6 is a perspective view schematically showing another device of the embodiment. FIG. 7 is a front view schematically showing a state in which the device of FIG. 6 is installed on the pedestal 8.

The device used in this example is the same as that of FIGS. 1 and 2. It should be noted that the first conductive layer 10A is formed on the side face 1c of the device, and the second conductive layer 10B is formed on the side face 1d of the device. Further, the conductive layer 28 is formed on an upper face 5b of the device 1. The conductive layer 28 is connected with the conductive layers 10A and 10B, whereby the conductive layers 10A and 10B are electrically conductive to each other.

A method of manufacturing the conductive layer is not limited, and examples thereof can be shown below.

(1) A metal thin film is formed on the side face of the device according to a sputtering method.

(2) A conductive paste is applied to the side face of the device by printing and baked.

(3) A conductive tape is stuck to the side face of the device.

From the viewpoint of the present invention, the conductive material is preferably contacted with the device over 80% or more of an area of the side face of the device, and more preferably over 90% or more of the area of the side face of the device. The upper limit is not particularly set, and the conductive material can be contacted with the device over 100% of the area of the side face of the device.

The conductive material is not particularly limited, and a metal and a conductive paste can be exemplified. In particular, Al, Ti, Ta, Cu, Ag paste, and In paste are preferred.

A thickness of the conductive layer is not particularly limited. From the viewpoint of the present invention, the thickness of the conductive layer is preferably 0.1 μm or more, and more preferably 0.5 μm or more. Further, although the upper limit of the thickness of the conductive layer is not particularly defined, it may preferably be 10 μm or less in consideration of ease of formation.

The channel type optical waveguide formed in the wavelength conversion layer is not limited, and may include a ridge type optical waveguide, a diffusion optical waveguide or the like. The diffusion optical waveguide can be formed by a metal diffusion process (e.g., titanium diffusion process) or proton exchange process. A processing method for forming a ridge structure is not limited, and machining, ion milling, dry etching, laser ablation or the like can be used.

The ferroelectric single crystal for forming the wavelength conversion layer is not limited, and lithium niobate, lithium tantalate, a solid solution of lithium niobate-lithium tantalate, $K_3Li_2Nb_5O_{15}$ or $La_3Ga_5SiO_{14}$ can be exemplified.

The adhesive for adhering the wavelength conversion layer to the supporting substrate or the upper-side substrate may be an inorganic adhesive, an organic adhesive or a combination of inorganic and organic adhesives.

Although specific examples of the organic adhesive is not particularly limited, it may be epoxy resin adhesive, acrylic resin adhesive, a thermosetting resin adhesive, an ultraviolet curable resin adhesive, or "Alon ceramics C" (trade name: Supplied by Toa Gosei Co. Ltd.,) having a thermal expansion coefficient (thermal expansion coefficient of $13 \times 10^{-6}/K$) relatively close to that of a material having an electro-optic effect, such as lithium niobate.

Further, the inorganic adhesive preferably has a low dielectric constant and an adhesive temperature (working temperature) of about 600° C. or lower. Further, it is preferable that a sufficiently high adhesive strength can be obtained during the processing. Specifically, it is preferably a glass having a composition of one or more of silicon oxide, lead oxide, aluminum oxide, magnesium oxide, calcium oxide, boron oxide or the like. Further, another inorganic adhesive includes tantalum pentoxide, titanium oxide, niobium pentoxide or zinc oxide, for example.

A method of forming the inorganic adhesive layer is not particularly limited and includes a sputtering, vapor deposition, spin coating, or sol-gel method.

Further, a sheet of an adhesive may be interposed between the ferroelectric layer 3 and the supporting substrate 2 as well as the ferroelectric layer 3 and the upper-side substrate 5 to join them. Preferably, a sheet made of a thermosetting, photocuring or photothickening resin adhesive is interposed between the ferroelectric layer 3 and the supporting body 2 as well as the ferroelectric layer 3 and the upper-side substrate 5, and the sheet is then cured. For such a sheet, a resin film having a thickness of 10 μm or less is appropriate.

Specific examples of the material of the supporting substrate and the upper-side substrate are not particularly limited. Lithium niobate, lithium tantalate, a glass such as quartz glass, quartz, Si or the like can be exemplified. In this case, from the viewpoint of difference of thermal expansion coefficient, the materials of the wavelength conversion layer, the supporting substrate, and the upper-side substrate may preferably be the same, and most preferably be lithium niobate single crystal. A thickness of the upper-side substrate and that of the supporting substrate are not particularly limited, but may preferably be 100 μm or more from the above viewpoint. Further, although the upper limit of the thickness of the supporting substrate and that of the upper-side substrate is not particularly defined, it is preferably 2 mm or less from a practical view.

EXAMPLES

Comparative Example 1

The device 1 shown in FIGS. 1 and 2 was manufactured. In particular, the periodic domain inversion structure having a period of 6.6 μm was formed on an MgO 5% doped lithium niobate-5 degree off-cut Y substrate of 0.5 mm thick. An adhesive (acrylic adhesive) was applied to a non-doped lithium niobate substrate of 0.5 mm thick, to which was stuck the above MgO doped lithium niobate substrate 2. The face of the MgO doped lithium niobate substrate was abraded and polished until the thickness thereof reached 3.7 μm to obtain a thin plate. Next, by the laser ablation processing method, a ridge structure 4 (optical waveguide 24) was formed on this thin plate. After forming the optical waveguide, an $SiO_2$ overcladding film of 0.5 μm thick was formed by a sputtering method.

Next, the upper-side substrate 5 made of lithium niobate having a thickness of 500 μm was adhered to the $SiO_2$ overcladding film using an epoxy adhesive to obtain a device. The device was cut into a length of 9 mm and a width of 1.0 mm by a dicer to obtain a chip 1. Then, the incident face 1a and the projection face 1b of the chip 1 were polished. Thereafter, an antireflection film was applied to both faces of the chip.

The optical characteristics of the device were measured by using an Nd-YAG laser. The oscillation output from the laser was adjusted to 500 mW, and the fundamental light was condensed on the end face of the waveguide by a lens; as a result, an SHG output of 200 mW was obtained. The wavelength of the fundamental light at that moment was 1064.3 nm.

This device was subjected to the heat cycle test of −40° C./80° C. After 500 cycles, the output of a second higher harmonic wave (SHG) was measured again, and as a result, the SHG output was deteriorated to 70 mW.

Example 1

The same device as the comparative example 1 was manufactured. It should be noted that, as shown in FIGS. 6 and 7, aluminum films 10A, 10B, and 28 were formed on the upper face 5b, and side faces 1c and 1d of the device 1, respectively, by a sputtering method. A thickness of the aluminum film was 0.2 μm. The aluminum films 10A and 10B were set to cover 100% of each area of the side faces 1c and 1d, respectively.

The optical characteristics of the device were measured by using an Nd-YAG laser. The oscillation output from the laser was adjusted to 500 mW, and the fundamental light was condensed on the end face of the waveguide by a lens; as a result, an SHG output of 200 mW was obtained. The wavelength of the fundamental light at that moment was 1064.3 nm.

This device was subjected to the heat cycle test of −40° C./80° C. After 500 cycles, the SHG output was measured again, and as a result, deterioration in the SHG output was not found.

Example 2

The same device as the Example 1 was manufactured. It should be noted that the aluminum films 10A and 10B were set to cover 80% of each area of the side faces 1c and 1d, respectively.

This device was subjected to the heat cycle test of −40° C./80° C. After 500 cycles, the SHG output was measured again, and as a result, deterioration in the SHG output was not found.

Example 3

The same device as the Example 1 was manufactured. It should be noted that the aluminum films 10A and 10B were set to cover 70% of each area of the side faces 1c and 1d, respectively.

This device was subjected to the heat cycle test of −40° C./80° C. After 500 cycles, the SHG output was measured again, and as a result, the SHG output was 191 mW.

The invention claimed is:

1. A harmonics generating device comprising:

a supporting substrate;

a wavelength conversion layer comprising a channel type optical waveguide comprising a periodic domain inversion structure provided therein, the layer comprising an X plate or offset X plate comprising a ferroelectric single crystal;

a base adhesive layer for adhering a lower face of the wavelength conversion layer and the supporting substrate;

an upper-side substrate provided on an upper face side of the wavelength conversion layer;

an upper-side adhesive layer for adhering the wavelength conversion layer and the upper-side substrate;

an incident face of a fundamental wave;

a projection face of higher harmonics;

a first side face between the incident face and the projection face; and a second side face opposing the first side face, the device further comprising:

a first conductive material contacted with the first side face; and a second conductive material contacted with the second side face; wherein the first conductive material and the second conductive material are electrically conductive to each other.

2. The harmonics generating device of claim 1, wherein the first conductive material and the second conductive material comprise conductive layers, respectively.

3. The harmonics generating device of claim 1, wherein the first conductive material comprises a conductive plate, and the second conductive material comprises a pedestal for installing the wavelength conversion device.

* * * * *